US011606391B2

(12) United States Patent
Greenebaum et al.

(10) Patent No.: US 11,606,391 B2
(45) Date of Patent: Mar. 14, 2023

(54) METHOD FOR CONTROLLING AND PROVISIONING RESOURCE ACCESS

(71) Applicant: JPMorgan Chase Bank, N.A., New York, NY (US)

(72) Inventors: Rachel Greenebaum, Brooklyn, NY (US); Suryakantham Chinthapalli, Plano, TX (US); David Laurance, Dobbs Ferry, NY (US); Isaac Leonard Blum, Armonk, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/804,881

(22) Filed: Feb. 28, 2020

(65) Prior Publication Data

US 2020/0280588 A1 Sep. 3, 2020

Related U.S. Application Data (60) Provisional application No. 62/811,947, filed on Feb. 28, 2019.

(51) Int. Cl.
*H04L 9/40* (2022.01)
*G06F 21/62* (2013.01)

(52) U.S. Cl.
CPC .......... *H04L 63/20* (2013.01); *G06F 21/6218* (2013.01); *H04L 63/101* (2013.01); *H04L 63/102* (2013.01); *G06F 2221/2141* (2013.01)

(58) Field of Classification Search
CPC .. G06F 21/00; G06F 21/60; G06F 21/62–629; G06F 2221/00;

(Continued)

(56) References Cited

U.S. PATENT DOCUMENTS 7,523,206 B1\* 4/2009 Naish .................... G06F 15/173
                                                    709/224
7,590,684 B2\* 9/2009 Herrmann ............... H04L 63/08
                                                    709/203

(Continued)

OTHER PUBLICATIONS

International Search Report and PCT Written Opinion in corresponding International Application No. PCT/US2020/20448, dated Jun. 2, 2020.

(Continued)

*Primary Examiner* — Michael A Keller
(74) *Attorney, Agent, or Firm* — Greenblum & Bernstein, P.L.C.

(57) ABSTRACT

A method for controlling an access to a resource is provided. The method includes receiving, from a first user, a first input that relates to a business criterion for a provision of the access to the resource; receiving, from a second user, a second input that relates to an application-specific criterion for the provision of the access to the resource; generating one or more one access-control rules based on the inputs; receiving an access request; and determining whether to grant the access request based on the rules, and any conditions that pertain to the access. The method effectively decouples the business-related criterion from the application-specific criterion for the access determination, thereby ensuring that business stakeholders and application owners each have an independent ability to provide inputs for generating access-control rules and policies.

14 Claims, 7 Drawing Sheets

(58) Field of Classification Search
CPC ......... G06F 2221/21; G06F 2221/2141; H04L 63/00; H04L 63/10; H04L 63/101; H04L 63/102; H04L 63/20
See application file for complete search history.

(56) References Cited

U.S. PATENT DOCUMENTS

| | | | | |
|---|---|---|---|---|
| 7,783,666 | B1* | 8/2010 | Zhuge | G06F 16/122 |
| | | | | 707/783 |
| 8,149,113 | B2* | 4/2012 | Diem | H04L 67/52 |
| | | | | 701/484 |
| 9,985,969 | B1* | 5/2018 | Cavage | H04L 63/102 |
| 11,102,207 | B2* | 8/2021 | Peppe | H04L 63/107 |
| 2002/0147801 | A1 | 10/2002 | Gullotta et al. | |
| 2007/0094716 | A1* | 4/2007 | Farino | G07C 9/27 |
| | | | | 726/5 |
| 2008/0307055 | A1* | 12/2008 | Waters | G06F 16/3331 |
| | | | | 709/206 |
| 2009/0249440 | A1* | 10/2009 | Platt | H04L 63/20 |
| | | | | 726/1 |
| 2011/0184771 | A1* | 7/2011 | Wells | G06Q 10/063114 |
| | | | | 705/7.14 |
| 2014/0075492 | A1 | 3/2014 | Kapadia et al. | |
| 2014/0090026 | A1 | 3/2014 | Mishra et al. | |
| 2014/0123312 | A1 | 5/2014 | Marcotte | |
| 2016/0294837 | A1* | 10/2016 | Turgeman | G06F 21/316 |
| 2018/0018473 | A1* | 1/2018 | Knibbe | H04W 12/64 |
| 2020/0104521 | A1* | 4/2020 | Malliah | G06F 16/2246 |
| 2021/0012328 | A1* | 1/2021 | Wilczek | G06Q 30/0637 |

OTHER PUBLICATIONS

Rathod et al., "Semantically Rich, Context Aware Access Control for Openstack," 2018 IEEE 4th International Conference on Collaboration and Internet Computing, Oct. 18, 2018, pp. 460-465.
Supplementary European Search Report for corresponding European Application No. 20763013.8, dated Oct. 17, 2022.

* cited by examiner

METHOD FOR CONTROLLING AND PROVISIONING RESOURCE ACCESS

CROSS-REFERENCE TO RELATED APPLICATION

This application claims the benefit of U.S. Provisional Patent Application Ser. No. 62/811,947, filed Feb. 28, 2019, which is hereby incorporated by reference in its entirety.

BACKGROUND

1. Technical Field

The present disclosure relates to the field of resource access controls and provisions. More particularly, the present disclosure relates to a method for controlling and provisioning access to a resource based on rules and policies derived from independent inputs from business stakeholders and application owners.

2. Background

Business entities and organizations typically operate applications and generate information that are sensitive and/or proprietary. As a result, access to such applications and information should be carefully controlled, in order to avoid potential costs and/or adverse outcomes. Conventionally, access control has been implemented by using Role Based Access Control (RBAC) software that generally allocates access based on a job title of an employee.

However, in many instances, an access allocation that is based on an employee's job title may fail to account for other factors that are relevant to an optimal determination regarding access to a particular resource. For example, it may be advantageous to provide access during a particular time interval and to deny access outside of the particular time interval. As another example, an access allocation may be appropriate for a particular employee based on a business function being performed, in which case the job title may not provide sufficient information for making a proper determination regarding access. In addition, there may be multiple parties that have independent interests that relate to the access determination, and as such, there is a need for facilitating an access allocation that accounts for separate inputs from independent parties. Further, there is a need for governance and tracking of access allocations and rule changes that may occur, particularly in view of the potential impacts to all of the affected parties.

SUMMARY

The present disclosure, through one or more of its various aspects, embodiments, and/or specific features or sub-components, provides, inter alia, various systems, servers, devices, methods, media, programs, and platforms for controlling and provisioning access to a resource based on rules and policies derived from independent inputs from business stakeholders and application owners.

According to an aspect of the present disclosure, a method for controlling an access to a resource is provided. The method is implemented by at least one processor. The method includes: receiving, from a first user, a first input that relates to a business criterion for a provision of the access to the resource; receiving, from a second user, a second input that relates to an application-specific criterion for the provision of the access to the resource; generating, based on the first input and the second input, at least one rule for the provision of the access of the resource; receiving, from a third user, a resource access request that includes information that relates to an identification of the third user; determining, based on the at least one rule and the information included in the resource access request, whether to grant the access to the resource, and at least one condition upon which the access grant is contingent; and transmitting, to the third user, a message that indicates a result of the determining.

The business criterion may include at least one of an indication of an entity to which the access is to be granted and an indication of a condition upon which the access grant depends.

The first input may include at least one of a name of a person, a job title of an employee, a name of a group, an organizational identification, access time information, a permissible access location, and an operational aspect of the access.

The application-specific criterion may include at least one of an indication of an entity to which the access is to be granted and an indication of a condition upon which the access grant depends.

The second input may include at least one of a name of a person, a job title of an employee, a name of a group, an organizational identification, access time information, a permissible access location, and an operational aspect of the access.

The method may further include validating the result of the determining by performing an access management certification.

The access management certification may include at least one of a policy certification, a role certification, an exception certification, a segregation of duty certification, and an access termination certification.

When the result of the determining indicates that the access is to be granted to the third user, the method may further include authenticating an identification of the third user and granting the access to the third user in response to a successful authentication.

The method may further include: storing, in a memory, information that relates to a record of the access grant; and adjusting the at least one rule based on the stored information.

The method may further include: receiving, from at least one of the first user and the second user, a request that relates to a proposed access rule change; and adjusting the at least one rule based on the received request.

According to another aspect of the present disclosure, a computing apparatus for controlling an access to a resource is provided. The computing apparatus includes a processor, a memory, and a communication interface coupled to each of the processor and the memory. The processor is configured to: receive, from a first user via the communication interface, a first input that relates to a business criterion for a provision of the access to the resource; receive, from a second user via the communication interface, a second input that relates to an application-specific criterion for the provision of the access to the resource; generate, based on the first input and the second input, at least one rule for the provision of the access of the resource; receive, from a third user via the communication interface, a resource access request that includes information that relates to an identification of the third user; determine, based on the at least one rule and the information included in the resource access request, whether to grant the access to the resource, and at least one condition upon which the access grant is contingent; and transmit, to the third user via the communication interface, a message that indicates a result of the determination.

The business criterion may include at least one of an indication of an entity to which the access is to be granted and an indication of a condition upon which the access grant depends.

The first input may include at least one of a name of a person, a job title of an employee, a name of a group, an organizational identification, access time information, a permissible access location, and an operational aspect of the access.

The application-specific criterion may include at least one of an indication of an entity to which the access is to be granted and an indication of a condition upon which the access grant depends.

The second input may include at least one of a name of a person, a job title of an employee, a name of a group, an organizational identification, access time information, a permissible access location, and an operational aspect of the access.

The processor may be further configured to validate the result of the determination by performing an access management certification.

The access management certification may include at least one of a policy certification, a role certification, an exception certification, a segregation of duty certification, and an access termination certification.

When the result of the determination indicates that the access is to be granted to the third user, the processor may be further configured to authenticate an identification of the third user and grant the access to the third user in response to a successful authentication.

The processor may be further configured to: store, in the memory, information that relates to a record of the access grant; and adjust the at least one rule based on the stored information.

The processor may be further configured to: receive, from at least one of the first user and the second user via the communication interface, a request that relates to a proposed access rule change; and adjust the at least one rule based on the received request.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
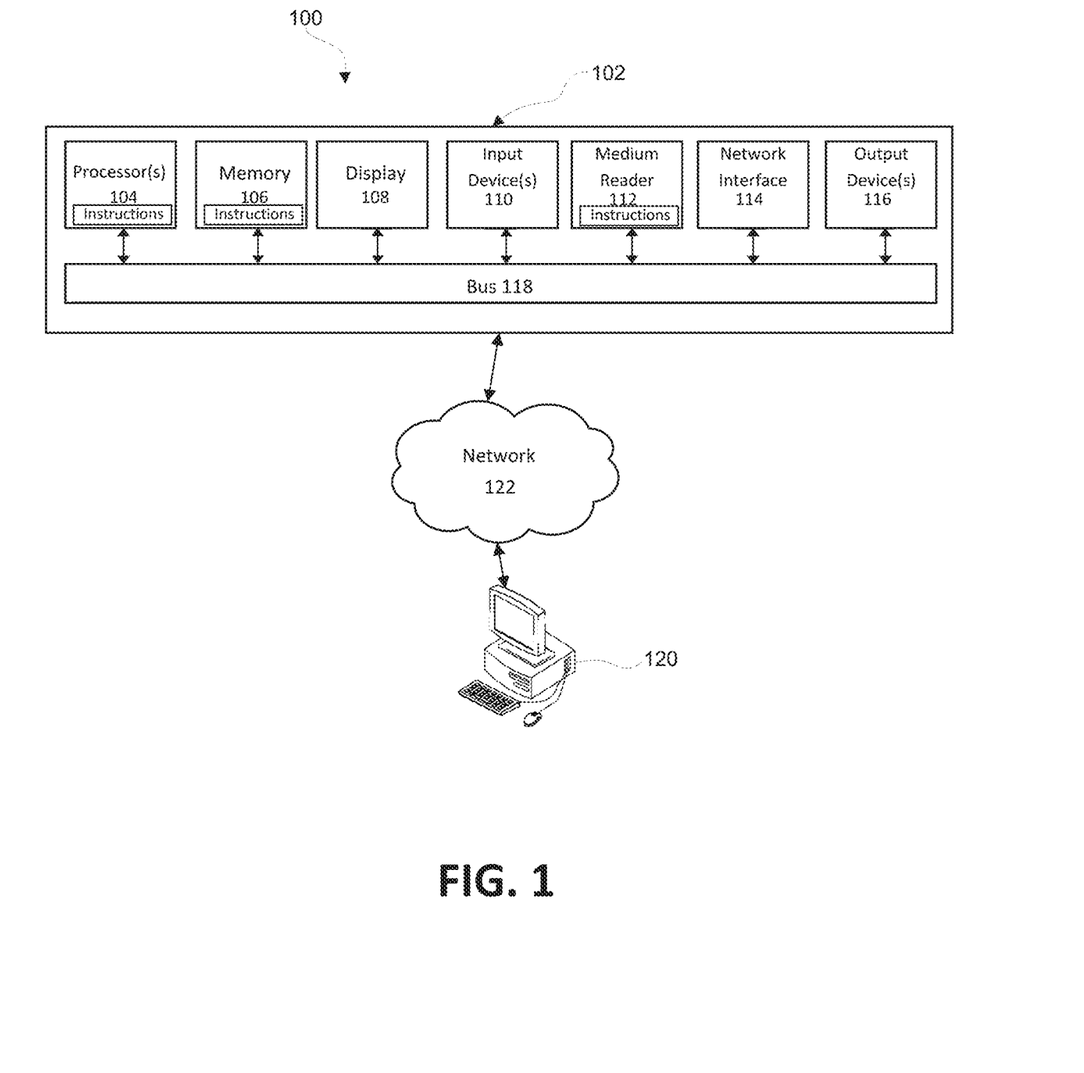
FIG. 1 illustrates an exemplary computer system for controlling and provisioning an access to a resource.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a video display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

Figure 2:
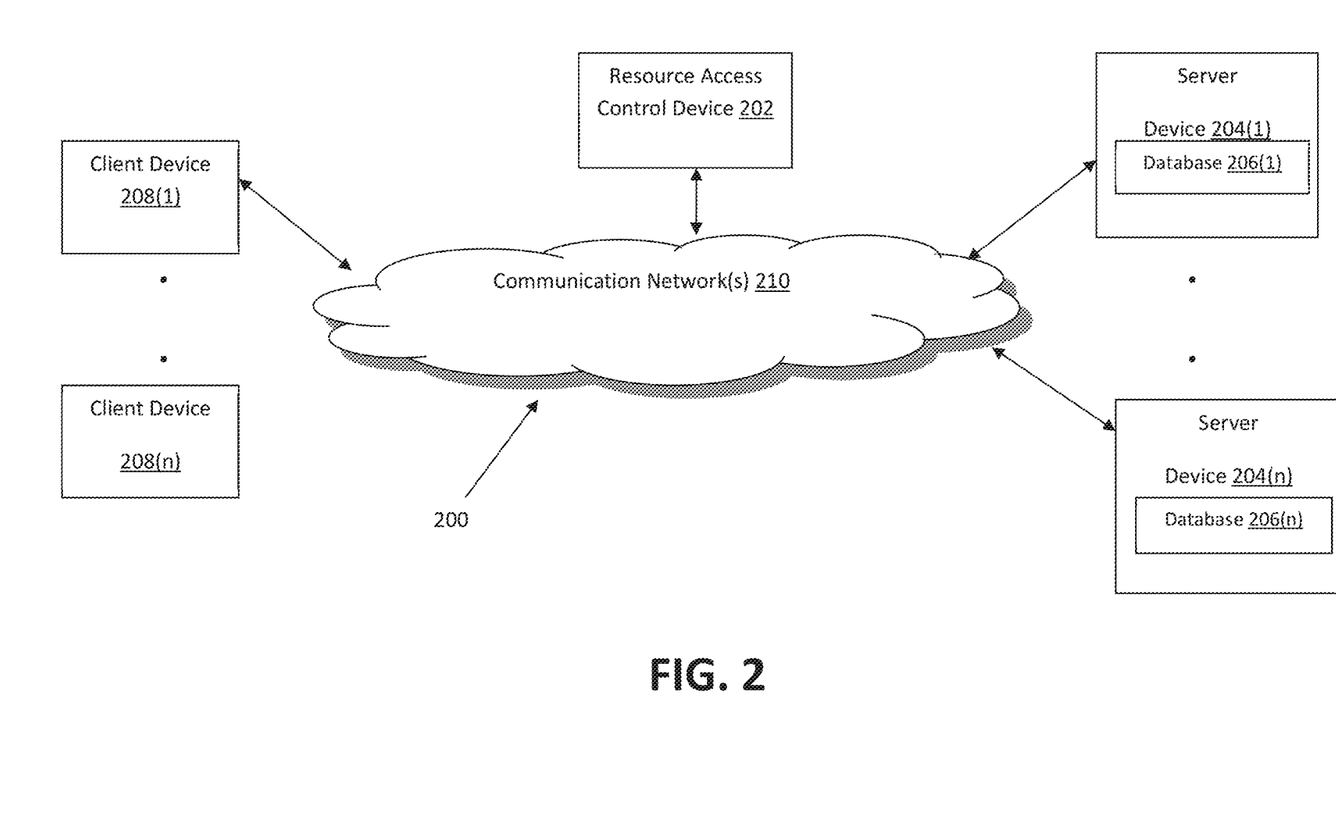
FIG. 2 illustrates an exemplary diagram of a network environment with an access control device.

Referring to FIG. 2, a schematic of an exemplary network environment 200 for controlling and provisioning an access to a resource based on rules and policies derived from multiple independent inputs from interested parties is illustrated. The resource for which access is being controlled and provisioned may be, for example, an application, such as an electronic mail application or a securities trading application. The resource may also be informational in nature, such as, for example, a proposal, a product description, or a sales forecast report.

The controlling and provisioning of resource accesses may be facilitated by a Resource Access Control (RAC) device 202. The RAC device 202 may be the same or similar to the computer system 102 as described with respect to FIG. 1. The RAC device 202 may store one or more applications that can include executable instructions that, when executed by the RAC device 202, cause the RAC device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the RAC device 202 itself, may be located in virtual server(s) running in a cloud-based computing environment rather than being tied to one or more specific physical network computing devices. Also, the application(s) may be running in one or more virtual machines (VMs) executing on the RAC device 202. Additionally, in one or more embodiments of this technology, virtual machine(s) running on the RAC device 202 may be managed or supervised by a hypervisor.

In the network environment 200 of FIG. 2, the RAC device 202 is coupled to a plurality of server devices 204(1)-204(n) that hosts a plurality of databases 206(1)-206(n), and also to a plurality of client devices 208(1)-208(n) via communication network(s) 210. A communication interface of the RAC device 202, such as the network interface 114 of the computer system 102 of FIG. 1, operatively couples and communicates between the RAC device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the RAC device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and RAC devices that efficiently facilitate controlling and provisioning resource accesses.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The RAC device 202 may be a standalone device or integrated with one or more other devices or apparatuses, such as one or more of the server devices 204(1)-204(n), for example. In one particular example, the RAC device 202 may include or be hosted by one of the server devices 204(1)-204(n), and other arrangements are also possible. Moreover, one or more of the devices of the RAC device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the RAC device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store access policies and rules, access history information, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can facilitate the controlling of accesses to resources, such as in response to user interaction with graphical user interfaces for example. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the RAC device 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the RAC device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the RAC device 202, the server devices 204(1)-204(n), or the client devices 208(1)-208(n), for example, may be configured to operate as virtual instances on the same physical machine. In other words, one or more of the RAC device 202, the server devices 204(1)-204(n), or the client devices 208(1)-208(n) may operate on the same physical device rather than as separate devices communicating through communication network(s) 210. Additionally, there may be more or fewer RAC devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
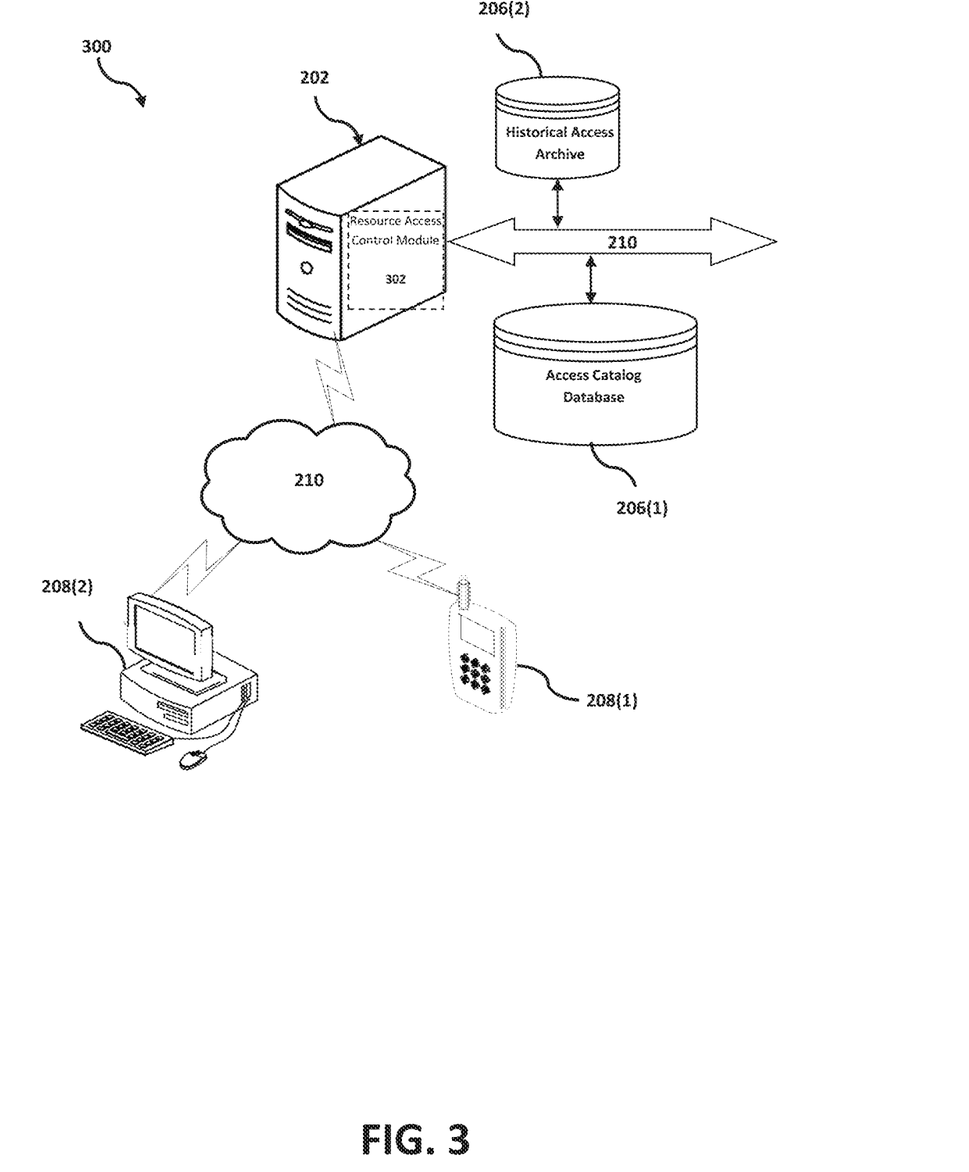
FIG. 3 shows an exemplary system for controlling and provisioning an access to a resource based on rules and policies derived from independent inputs from multiple interested parties.

The RAC device 202 is described and shown in FIG. 3 as including a resource access control module 302, although it may include other modules, databases, or applications, for example. As will be described below, the resource access control module 302 is configured to determine access provisions for respective resources based on rules and policies that are derived from inputs provided by business stakeholders and application owners and developers. Based on these inputs, each of which may be received from one of client devices 208(1)-208(n), the resource access control module 302 generates rules and policies that govern access control for a given resource, and then uses the rules and policies to make determinations regarding access provisions for the resource. Further, referring also to FIG. 5, the access catalog database 206(1) provides governance and continuity with respect to different domains, each of which may provide input that may cause changes in the rules and policies that govern access control, and which therefore may cause impacts across the various domains. In addition, when a user attempts to access a resource after being granted access, the resource access control module 302 is configured to generate and store a historical record of the user access/interaction in the historical access archive 206(2).

An exemplary process 300 for controlling and provisioning access to a resource by utilizing the network environment of FIG. 2 is shown as being conducted in FIG. 3. Specifically, a first client device 208(1) and a second client device 208(2) are illustrated as being in communication with RAC device 202. In this regard, the first client device 208(1) and the second client device 208(2) may be "clients" of the RAC device 202 and are described herein as such. Nevertheless, it is to be known and understood that the first client device 208(1) and/or the second client device 208(2) need not necessarily be "clients" of the RAC device 202, or any entity described in association therewith herein. Any additional or alternative relationship may exist between either or both of the first client device 208(1) and the second client device 208(2) and the RAC device 202, or no relationship may exist.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the RAC device 202 via broadband or cellular communication. Of course, these embodiments are merely exemplary and are not limiting or exhaustive.

Upon being started, the resource access control module 302 executes a process for controlling and provisioning an access to a resource. An exemplary process for controlling and provisioning an access to a resource is generally indicated at flowchart 400 in FIG. 4.

Figure 4:
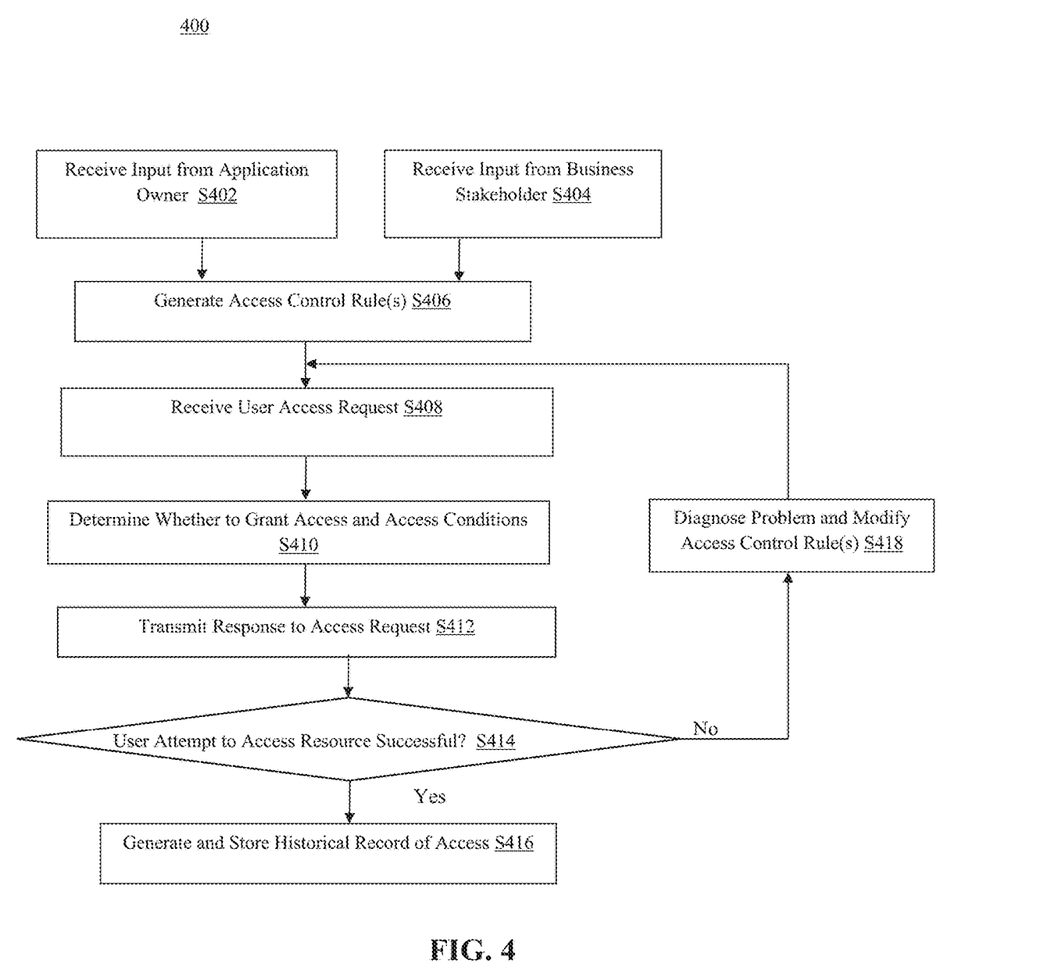
FIG. 4 is a flowchart of an exemplary process for controlling and provisioning an access to a resource.

In the process 400 of FIG. 4, at step S402, a first input that relates to an application-specific criterion for provisioning the access to the resource is received. The first input is typically provided by a application owner or application developer, i.e., an entity that has an application-specific interest in the resource. Each criterion for provisioning the access to the resource relates to indicating which entities are to be granted access and/or any conditions upon which the access grant depends (i.e., who can do what under what conditions). An indication regarding an entity to which access is to be granted may include identification information, such as, for example, a name of a person, a job title of an employee, a name of a group, an organizational identification (e.g., a name of a department within a particular company), and/or information that relates to a job function of an employee or group of employees. An indication regarding a condition upon which the access grant depends may include, for example, information that relates to timing or scheduling, information that relates to locations at which access is permissible, and information that relates to operational aspects of the access, e.g., a specific equipment item, such as a computer, that has been certified for accessing the resource.

At step S404, a second input that relates to a business criterion for provisioning an access to a resource is received. The second input is typically provided by a business stakeholder, i.e., an entity that has a business-related interest in the resource. Similarly as described above with respect to the first input, each criterion for provisioning the access to the resource relates to indicating which entities are to be granted access and/or any conditions upon which the access grant depends.

It is noted that additional inputs that relate to other criteria for provisioning the access to the resource may be received. There is no particular limit with respect to the number of such inputs.

At step S406, at least one access control rule is generated based on the received inputs. The at least one access control rule may include, for example, a policy that generally governs a broad grouping of accesses to the resource, or a rule that is specific to an individual access or to a relatively narrow set of potential accesses. The at least one access control rule is then stored in the access catalog database 206(1), which serves as a primary repository for resource-related information, infrastructure, and access policy information to support a flow of information within the access control system.

At step S408, a user access request is received from a client device 208. The user access request generally includes information that identifies the resource for which access is requested and identification information that relates to the requester. The user access request may also include additional information, such as a proposed schedule for the access, and/or any other pertinent information upon which a granting of the request relies. When a user access request is received, the request is stored in a historical access archive 206(2), which maintains a log of requests and historical information relating to the requests, such as access grants and denials.

At step S410, the resource access control module 302 makes a determination regarding whether to grant the user access request and any provisions that act as conditions for the granted access. The resource access control module 302 may make this determination based on an application of the rules and policies that are stored in the access catalog database 206(1) with respect to the information included in the user access request.

At step S412, the resource access control module 302 transmits a response to the user access request. The response generally includes an indication as to whether access is granted or denied, and the response may also include information that relates to access provisions, such as, for example, a time interval during which the access is permitted, a location at which access is permitted, or any other conditions that relate to the access. The response may also be stored in the historical access archive 206(2).

At step S414, based on a granted access request, the user attempts to access the resource, and a determination is made as to whether the resource is successfully accessed. When the attempt is successful, at step S416, a historical record of the access is generated and stored in the historical access archive 206(2).

When the attempt is not successful, at step S416, the resource access control module 302 determines a cause of the access failure, thereby diagnosing a problem, and then modifies at least one access control rule based on the diagnosis. For example, if the system receives a request to perform a function that is not possible to be performed, the problem may be diagnosed as being a function definition problem, and the function definition may be amended to remedy the problem. As another example, the system may fail for a routine operational reason, and the problem may be remedied by identifying an operational problem with a system component.

Figure 5:
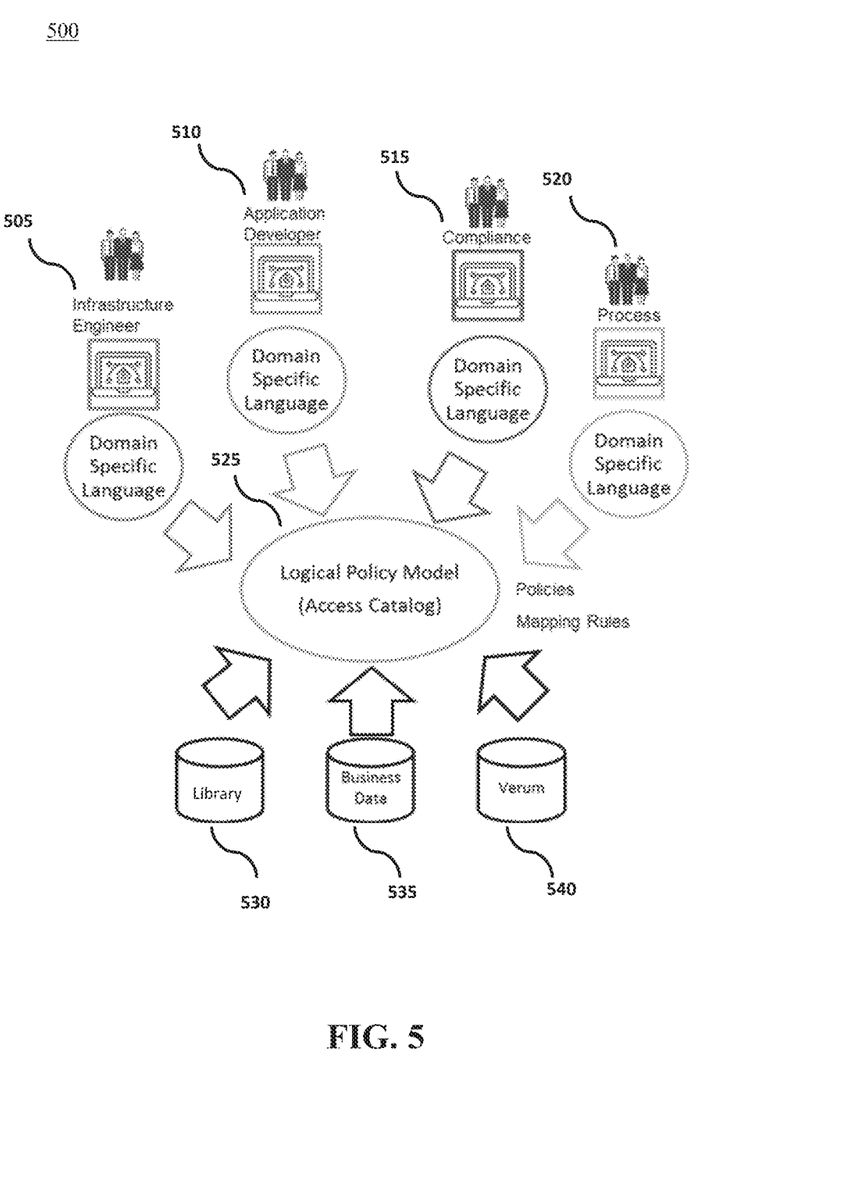
FIG. 5 illustrates an exemplary diagram of a logical policy model that provides governance and continuity of an access control system while accepting inputs from various parties.

Referring to FIG. 5, an exemplary diagram 500 of a logical policy model 525 that provides governance and continuity of an access control system while accepting inputs from various parties is provided. As illustrated in FIG. 5, the logical policy model 525 (also referred to herein as an "Access Catalog") provides governance and continuity with respect to different domains, each of which may provide input that may cause changes in the rules and policies that govern access control, and which therefore may cause impacts across the various domains. For example, a first domain may correspond to an infrastructure engineer 505; a second domain may correspond to an application developer 510; a third domain may correspond to compliance 515; and a fourth domain may correspond to process 520. In addition, the logical policy model 525 may be configured to access various databases, including a library database 530, a database that stores business data 535, and a Verum database 540.

In an exemplary embodiment, the library database 530 serves as a central repository for business applications and for commercial and open sources products that are used by a particular organization. The business data 535 may include attributes that refer to elements within a business, such as, for example, stock quotes and legal entities. In an exemplary embodiment, the Verum database 540 serves as a repository for technology infrastructure inventory and referential data, and may organize data according to domains, objects and attributes.

In this aspect, when an infrastructure engineer 505 provides an input that leads to a modification of an access control rule, the rule modification may cause an impact to the application developer 510, compliance 515, and process 520 domains, and as a result, the logical policy model 525 may be configured to adapt and implement the modification so as to minimize adverse impacts.

Figure 6:
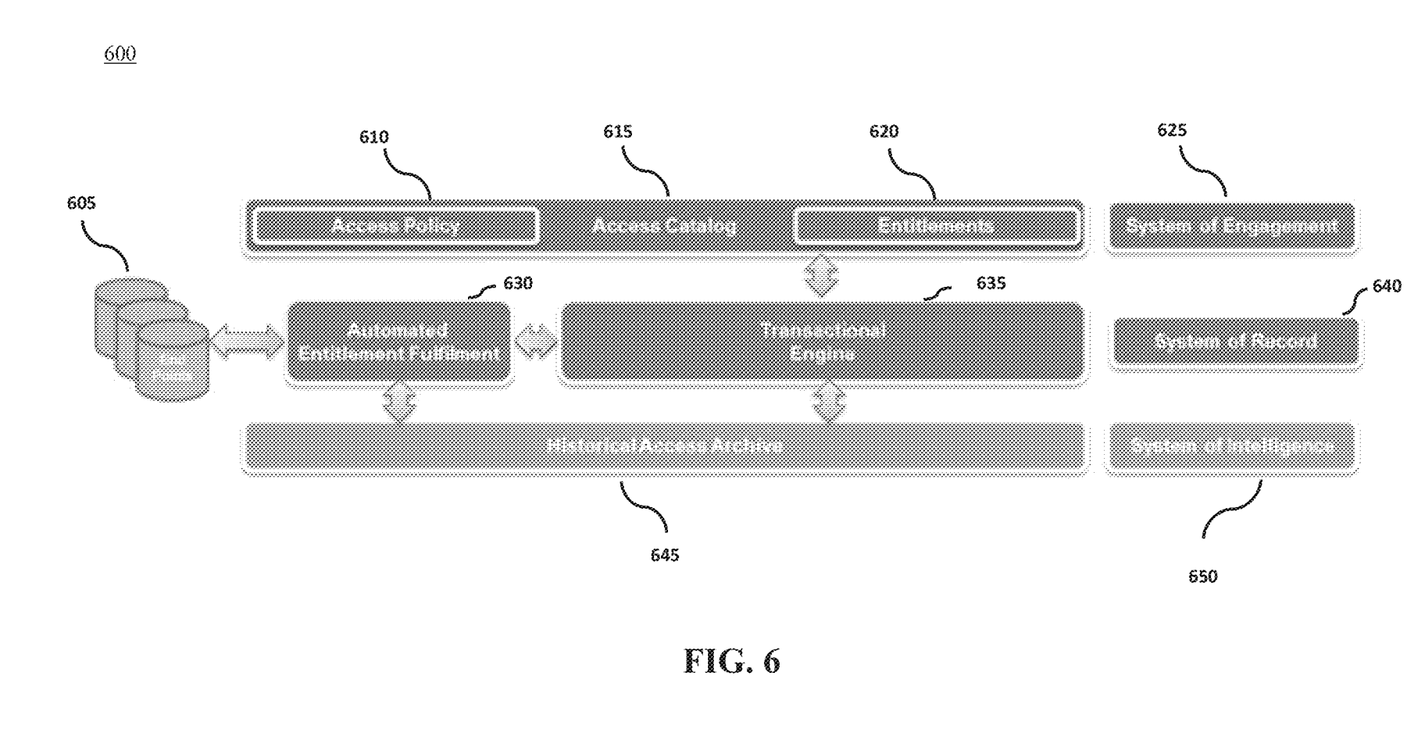
FIG. 6 is a block diagram that illustrates a platform architecture for an access ledger information model, according to an exemplary embodiment.

FIG. 6 is a block diagram that illustrates a platform architecture 600 for an access ledger information model, according to an exemplary embodiment. The platform architecture 600 includes a suite of systems that interoperate within the access control system, including a system of engagement 625, a system of record 640, and a system of intelligence 650. The platform architecture 600 also includes a transactional engine 635 that interfaces with an access catalog 615 that includes an access policy section 610 and an entitlements section 620, a historical access archive 645, and an automated entitlement fulfillment component 630 that interfaces with various end points 605 that are associated with users. Referring also to FIGS. 2 and 3, in an exemplary embodiment, the transactional engine 635 corresponds to the RAC device 202 and hosts the resource access control module 302; the historical access archive 645 corresponds to the historical access archive 206(2); and the access catalog 615 corresponds to the access catalog database 206(1).

Figure 7:
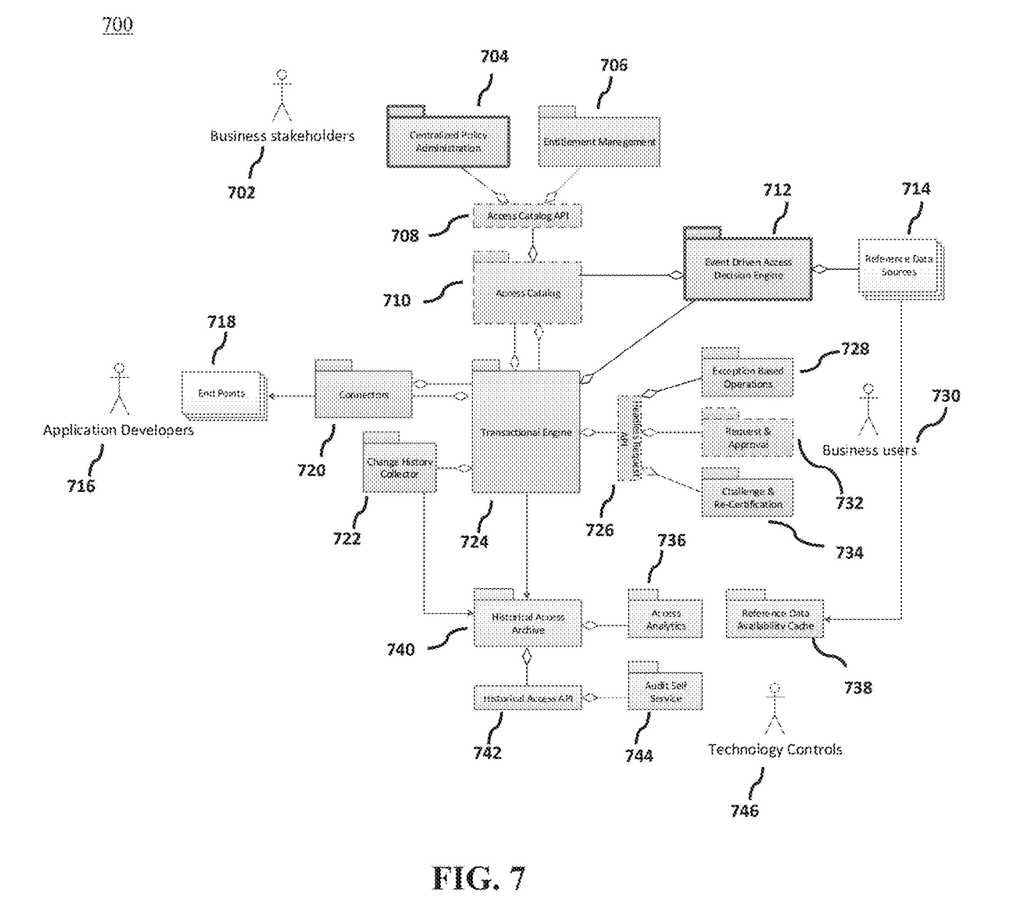
FIG. 7 is a data flow diagram that illustrates associations of various types of data with parties that provide governance and administration of an access control system, according to an exemplary embodiment.

FIG. 7 is a data flow diagram 700 that illustrates associations of various types of data with parties that provide governance and administration of an access control system, according to an exemplary embodiment. As illustrated in the data flow diagram 700, there are various parties that perform respective governance and/or administrative roles with respect to the access control system, including business stakeholders 702, business users 730, application developers 716, and parties that relate to technology controls 746.

A transactional engine 724 is provided at a central point within the data flow diagram 700. In an exemplary embodiment, the transactional engine 724 interfaces with an access catalog 710, which utilizes an access catalog application programming interface (API) 708 in order to provide an interface with business stakeholders 702 that may provide inputs that relate to centralized policy administration 704 and/or entitlement management 706. The access catalog 710 also interacts with an event driven access decision engine 712, which receives inputs from reference data sources 714 and then provides input to the transactional engine 724. The reference data sources 714 may also provide inputs to a reference data availability cache 738 that is primarily used by technology controls personnel 746.

The transactional engine 724 also interfaces with business users 730 via a headless request API 726. The business users 730 may provide inputs to the transactional engine 724 that relate to any of exception based operations 728, request and approval 732, and/or challenge and re-certification 734.

Application developers 716 correspond to end points 718 in the data flow diagram 700, and in this aspect, application developers 716 interface with the transactional engine 724 via connectors 720. The application developers 716 may also provide inputs via a change history collector 722 that effectively notifies the transaction engine 724 and the historical access archive 740 when a change in an application has been implemented.

The technology controls entities 746 interact with the historical access archive 740 via an historical access API 742, which receives inputs from an audit self service component 744. The historical access archive 740 also receives inputs that relate to access analytics 736.

Accordingly, with this technology, an optimized process for controlling and provisioning access to a resource based on rules and policies that are derived from independent inputs received from multiple entities is provided. The optimized process reduces risks by improving an ability to quickly identify, resolve, or remove inappropriate accesses to resources, and also mitigates audit and regulatory concerns that relate to access management by providing traceability with respect to which entities are granted access to a given resource and which conditions pertain to such an access.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for controlling an access to a resource, the method being implemented by at least one processor, the method comprising:
   receiving, from a first user that has a business-related interest in the resource, a first input that relates to a business criterion for a provision of the access to the resource;
   receiving, from a second user that has an application-specific interest in the resource, a second input that relates to an application-specific criterion for the provision of the access to the resource;
   generating, based on the first input and the second input, at least one rule for the provision of the access of the resource;
   receiving, from a third user, a resource access request that includes information that relates to an identification of the third user;
   determining, based on the at least one rule and the information included in the resource access request, whether to grant the access to the resource, and at least one condition upon which the access grant is contingent;
   transmitting, to the third user, a message that indicates a result of the determining;
   storing, in a memory, information that relates to a record of the access grant; and
   adjusting the at least one rule based on the stored information,
   wherein the business criterion includes at least one of an indication of an entity to which the access is to be granted and an indication of a condition upon which the access grant depends, and
   wherein the first input includes access time information.

2. The method of claim 1, wherein the application-specific criterion includes at least one of an indication of an entity to which the access is to be granted and an indication of a condition upon which the access grant depends.

3. The method of claim 2, wherein the second input includes at least one of a name of a person, a job title of an employee, a name of a group, an organizational identification, access time information, a permissible access location, and an operational aspect of the access.

4. The method of claim 1, further comprising validating the result of the determining by performing an access management certification.

5. The method of claim 4, wherein the access management certification includes at least one of an exception certification, a segregation of duty certification, and an access termination certification.

6. The method of claim 1, wherein when the result of the determining indicates that the access is to be granted to the third user, the method further includes authenticating an identification of the third user and granting the access to the third user in response to a successful authentication.

7. The method of claim 1, further comprising:
   receiving, from at least one of the first user and the second user, a request that relates to a proposed access rule change; and
   adjusting the at least one rule based on the received request.

8. A computing apparatus for controlling an access to a resource, the computing apparatus comprising:
   a processor;
   a memory; and
   a communication interface coupled to each of the processor and the memory, wherein the processor is configured to:
      receive, from a first user that has a business-related interest in the resource via the communication interface, a first input that relates to a business criterion for a provision of the access to the resource;
      receive, from a second user that has an application-specific interest in the resource via the communication interface, a second input that relates to an application-specific criterion for the provision of the access to the resource;
      generate, based on the first input and the second input, at least one rule for the provision of the access of the resource;
      receive, from a third user via the communication interface, a resource access request that includes information that relates to an identification of the third user;
      determine, based on the at least one rule and the information included in the resource access request, whether to grant the access to the resource, and at least one condition upon which the access grant is contingent;
      transmit, to the third user via the communication interface, a message that indicates a result of the determinations;

store, in the memory, information that relates to a record of the access grant; and adjust the at least one rule based on the stored information, wherein the application-specific criterion includes at least one of an indication of an entity to which the access is to be granted and an indication of a condition upon which the access grant depends, and wherein the second input includes access time information.

9. The computing apparatus of claim 8, wherein the business criterion includes at least one of an indication of an entity to which the access is to be granted and an indication of a condition upon which the access grant depends.

10. The computing apparatus of claim 9, wherein the first input includes at least one of a name of a person, a job title of an employee, a name of a group, an organizational identification, access time information, a permissible access location, and an operational aspect of the access.

11. The computing apparatus of claim 8, wherein the processor is further configured to validate the result of the determination by performing an access management certification.

12. The computing apparatus of claim 11, wherein the access management certification includes at least one of an exception certification, a segregation of duty certification, and an access termination certification.

13. The computing apparatus of claim 8, wherein when the result of the determination indicates that the access is to be granted to the third user, the processor is further configured to authenticate an identification of the third user and grant the access to the third user in response to a successful authentication.

14. The computing apparatus of claim 8, wherein the processor is further configured to:

receive, from at least one of the first user and the second user via the communication interface, a request that relates to a proposed access rule change; and adjust the at least one rule based on the received request.

\* \* \* \* \*